United States Patent
Simonsen et al.

(10) Patent No.: US 7,133,395 B2
(45) Date of Patent: Nov. 7, 2006

(54) MULTIPLE ACCESS BANDWIDTH-ON-DEMAND USING MSPK WITH AN EMBEDDED TRACKING CHANNEL

(75) Inventors: Harold L. Simonsen, South Jordan, UT (US); Kent R. Bruening, Sandy, UT (US); Clifford T. Johnson, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 835 days.

(21) Appl. No.: 09/827,760

(22) Filed: Apr. 6, 2001

(65) Prior Publication Data

US 2002/0146030 A1 Oct. 10, 2002

(51) Int. Cl.
*H04J 3/00* (2006.01)
*H04J 3/16* (2006.01)
*H04B 7/212* (2006.01)

(52) U.S. Cl. .................. 370/345; 370/442; 370/468
(58) Field of Classification Search ............... 370/442, 370/443, 458, 465, 468, 498, 503, 522, 524, 370/328, 336, 337, 338; 455/500, 507, 517, 455/522, 515, 68, 69, 70
See application file for complete search history.

(56) References Cited

U.S. PATENT DOCUMENTS

| | | | | | |
|---|---|---|---|---|---|
| 5,369,637 | A | * | 11/1994 | Richardson et al. | 370/281 |
| 5,502,744 | A | * | 3/1996 | Marshall | 375/259 |
| 5,671,218 | A | * | 9/1997 | I et al. | 370/252 |
| 5,982,813 | A | * | 11/1999 | Dutta et al. | 375/219 |
| 6,219,341 | B1 | * | 4/2001 | Varanasi | 370/252 |
| 6,687,510 | B1 | * | 2/2004 | Esteves et al. | 455/522 |
| 6,707,859 | B1 | * | 3/2004 | Kinnunen et al. | 375/316 |
| 2002/0027946 | A1 | * | 3/2002 | Ozluturk et al. | 375/130 |
| 2002/0054578 | A1 | * | 5/2002 | Zhang et al. | 370/328 |
| 2002/0080024 | A1 | * | 6/2002 | Nelson et al. | 340/503 |
| 2003/0073410 | A1 | * | 4/2003 | Hottinen et al. | 455/69 |

\* cited by examiner

*Primary Examiner*—Huy D. Vu
*Assistant Examiner*—Daniel Ryman
(74) *Attorney, Agent, or Firm*—Perman & Green, LLP

(57) ABSTRACT

A communications system comprising a central node, at least one remote node and a communications link. The remote node is adapted to receive information transmitted from the central node over a broadcast link and the communications link is adapted to convey information from the remote node to the central node. The central node is adapted to dynamically tailor a remote node transmit power control and a bandwidth as requested by the remote node for conveying information over the communications link.

18 Claims, 5 Drawing Sheets

MULTIPLE ACCESS BANDWIDTH-ON-DEMAND USING MSPK WITH AN EMBEDDED TRACKING CHANNEL

BACKGROUND OF THE INVENTION

1. Field of the Invention

The present invention relates generally to communication systems and, more particularly, to time division multiple access communication systems.

2. Brief Description of Related Developments

Traditional time division multiple access ("TDMA") architecture is characterized by fixed slot sites, a single channel and fixed data rates. A TDMA data link is generally limited to a single channel and cannot dynamically tailor assigned power and bandwidth as requested by individual users. The rate of that channel is adjusted to accommodate the most disadvantaged user; thereby impeding data transfer of more capable users. Current systems are incapable of dynamically compensating performance to meet current environmental and user information requirements.

SUMMARY OF THE INVENTION

The present invention is directed to, in a first aspect, a communications system. In one embodiment, the system comprises a central node, at least one remote node and a communications link. The remote node is adapted to receive information transmitted from the central node over a broadcast link and the communications link is adapted to convey information from the remote node to the central node. The central node is adapted to dynamically tailor a remote node transmit power control and a bandwidth as requested by the remote node for conveying information over the communications link.

In another aspect, the present invention is directed to a communications system. In one embodiment, the system comprises a central node adapted to transmit information over a broadcast link to at least one remote node and a time division multiple access link using a multi-phase shift key waveform to convey information from the remote node to the central node. The link includes a first channel to provide management functions for the broadcast link and the time division multiple access link, and a second channel adapted to operate at high data rates and meet the bandwidth needs of individual remote nodes.

In a further aspect, the present invention is directed to a method of dynamically altering transmit power control and bandwidth transmission requirements of a remote node in a communications network including a plurality of remote nodes. In one embodiment, the method comprises acquiring link management information transmitted from a central node to the remote node over a broadcast link and requesting a new remote node transmit power control and a new transmit data bandwidth from the central node by sending a request from the remote node to the central node over a time division multiple access communications link using a multi-phase shift key waveform. A high signal-to-noise ratio channel in the link is used to provide the remote node transmit power control. A wideband channel in each slot of the link is adapted to be rate adjusted to meet the transmit data bandwidth needs of the remote node on demand. The change is implemented one remote node slot time subsequent to the request.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
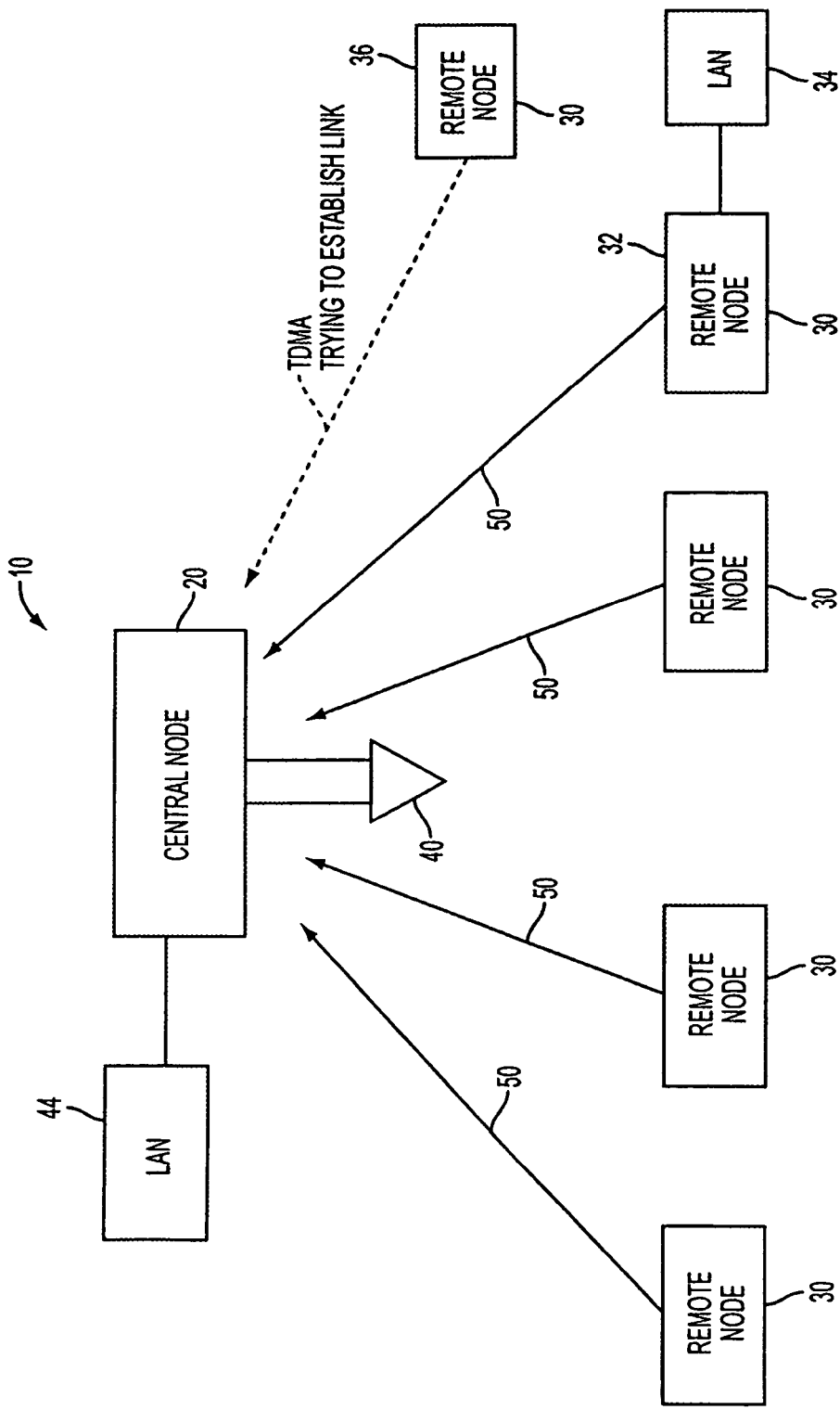
FIG. 1 is a block diagram of one embodiment of a system incorporating features of the present invention.

Referring to FIG. 1, there is shown a block diagram of a system 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Generally, as shown in FIG. 1, the system or communications network 10 comprises a central node 20 and one or more remote nodes 30 separated by some distance from the central node 20. A broadcast link 40 is used by the central node 20 to communicate with each of the remote nodes 30. A communications link 50 can be used by each remote node 30 to communicate with the central node 20. The broadcast link 40 and communications link 50 can be used to complete a duplex communications channel. The broadcast link 40 and the communications link 50 are generally adapted to facilitate communications and the transfer of data and information between the central node 20 and each remote node 30 and can include airborne communication transmission links or channels.

Figure 5:
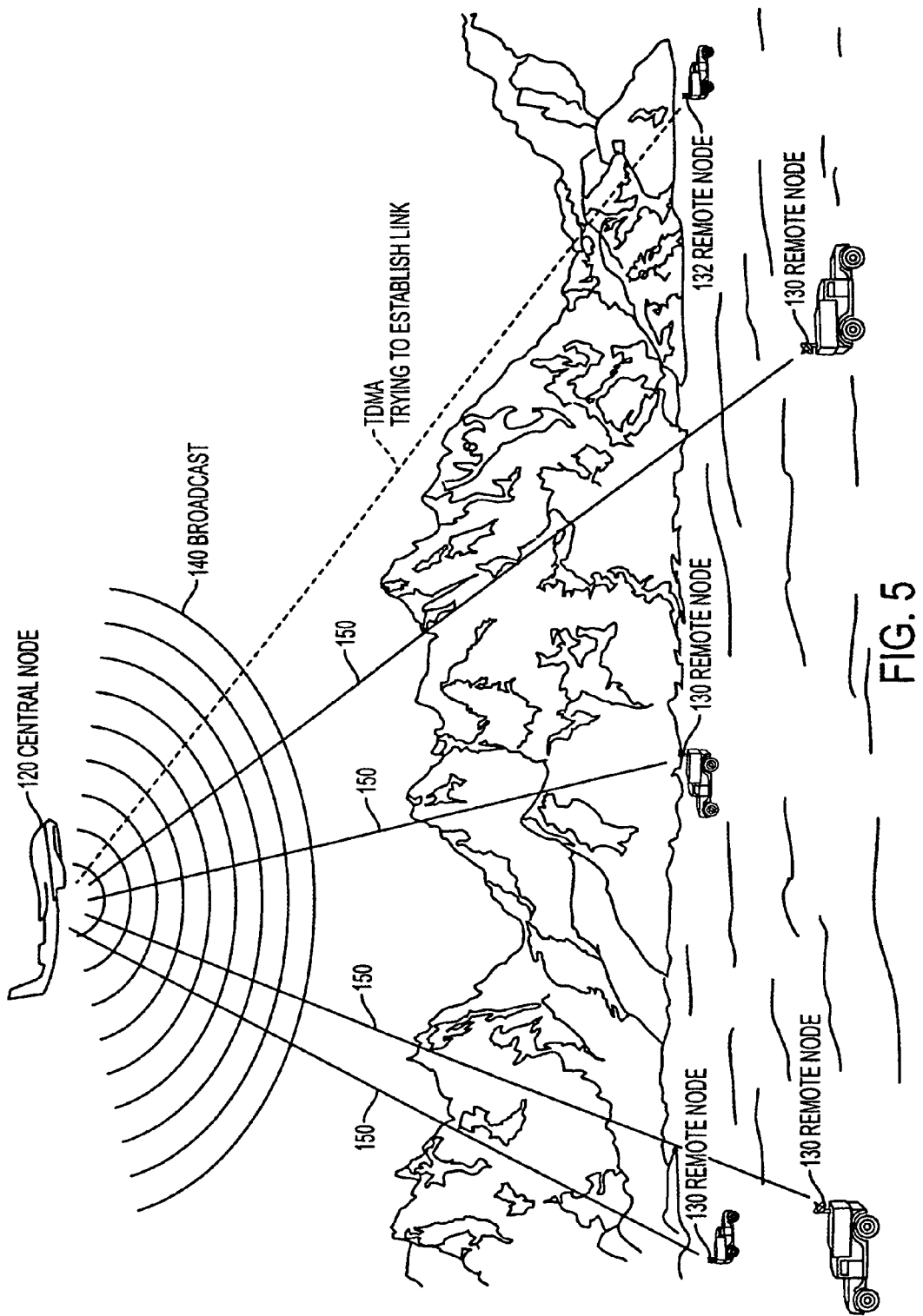
FIG. 5 is a block diagram of an embodiment of a system incorporating features of the present invention.

The central node 20 generally serves as a network master. It can be the source of the broadcast link 40 and the recipient of the communications link 50. The system 10 can also be configured so that the central node 20 serves as a relay where it is also connected or coupled with other remote nodes, such as for example, one or more airborne communication remote nodes or a local area network (LAN) 44. The airborne or LAN node 44 could be the primary source of the broadcast information that is transmitted over the broadcast link 40. The central node 20 can be an airborne node, and an example of an airborne platform in one embodiment of the system 10 is shown in FIG. 5. However, in alternative embodiments, the central node 20 is not restricted to being an airborne platform.

Generally, there can only be one central node 20 in a communication network 10 such as that shown in FIG. 1. The central node 20 generally provides the control, coordination, and maintenance necessary to sustain the communication network 10. It can also provide the routing of messages between any users that may be located on its platform or any of the remote nodes 30.

Referring to FIG. 1, a remote node 30 can be an active node adapted to receive and transmit, or a passive node adapted to receive only. In the preferred embodiment, the remote node 30 is an active node that communicates to the central node 20 via the communications link 50. Remote nodes 30 can be located in any desired environment, such as for example, ground, sea, or airborne. In one embodiment, a remote node 30 can also comprise a remote node terminal 32 that is adapted to manage and route messages pertaining to its LAN 34 and route messages between the central node 20 and its LAN 44 when active.

The broadcast link 40 is generally a continuous transmission from the central node 20 to each of the remote nodes 30 and can be used to transmit data and information from the central node 20 to each remote node 30. The broadcast link 40 generally uses traditional waveforms, such as for example, Bi-Phase Shift Keying ("BPSK"), quadrature phase shift keying ("QPSK"), Bi-Bi phase shift keying ("Bi-BPSK") and quadrature amplitude modulation ("QAM") and completes the full duplex communication between the central node 20 and the remote nodes 30 necessary to support a TDMA function. Generally, the broadcast link 40 includes a channel that is adapted to transfer unique link maintenance information from the central node 20 to the remote nodes 30. The link information generally comprises data used to maintain and manage both the broadcast link 40 and the communications link 50. Through the broadcast link 40, the central node 20 can issue command, control, and information ($C^2I$) that can be used to coordinate all remote node 30 data or communication link 50 activities. For example, the broadcast link 40 can orchestrate TDMA link configuration and operating functions pertaining to the TDMA operation of the participating remote nodes 30. As described herein, reference to the broadcast link 40 will be made or inferred when describing central node 20 functions.

Each communications link 50 can be used to convey or transmit data and information from each remote node 30 to the central node 20. Preferably, the communications link 50 is a TDMA link. In an alternate embodiment, the communications link 50 can comprise any suitable information transmission link. The communications link 50 generally comprises a series of burst transmissions originating with the active remote nodes 30 and terminating at the central node 20. Each burst transmission from a remote node 30 is generally confined to a fixed duration, also defined herein as a slot. Each link 50 can generally be viewed as a transmission comprising a series of slots 52. Multiple slots can be assigned to a single remote node 30. In a conventional TDMA system, the transmissions are divided into a series of time slices called slots. Each slot is defined to be of a fixed duration (size) and to convey a single data channel at a fixed data rate. Traditionally, the transmitting waveform is BPSK. A link management protocol is used to assign slots to remote nodes during which time they could transmit their information without interference from other remote nodes. The management function would also handle remote node entrance and exit into the "TDMA network."

In one embodiment of the present invention, instead of using a simple BPSK waveform with a single, fixed data rate, a multiple phase shift keying ("MPSK") waveform can be used where one channel can operate at a lower data rate to achieve a high signal-to-noise ratio ("SNR") that is robust and jam resistant. The remaining channels can provide a wideband conduit for conveying high speed user data originating at the remote node 30 and terminating at the central node 20. Channels can be relatively independent of each other. If the MPSK waveform is restricted to two orthogonal channels, a Bi-BPSK waveform results where one channel becomes the high SNR channel and the other channel is the wideband channel. The high SNR channel, because of its robustness, can provide slot timing, link synchronization and slot management. Normally, this channel can operate at a fixed and relatively low rate. Because the high SNR channel provides all the management functions for the communications link 50 and broadcast link 40, the wideband channels are free to be tailored to individual remote node 30 bandwidth needs and can operate at much higher data rates. Through the high SNR channel, the communications link 50 can adjust wideband channel performance on a slot by slot basis. This can be referred to as bandwidth-on-demand ("BOD"). It is a feature of the present invention to rate adjust the wideband channels in each slot to more efficiently meet the bandwidth needs of each remote node 30 on demand. This is a dynamic operation. Additionally, the high SNR channel can be used to provide remote node transmit power control. The slot transmit power can be adjusted based on range, environment or covertness for example. Current TDMA systems do not offer this capability because they use only the transmit channel to maintain slot timing. The high SNR channel is designed for covertness and sufficient SNR to maintain the link under most conditions. Because the high SNR channel is there to provide slot timing and synchronization, the wideband channels are free to be dynamically configured. Each user of the communications link 50 can transmit data based on their specific needs rather than the limitations in maintaining the communications link 50 and slot timing.

Figure 2:
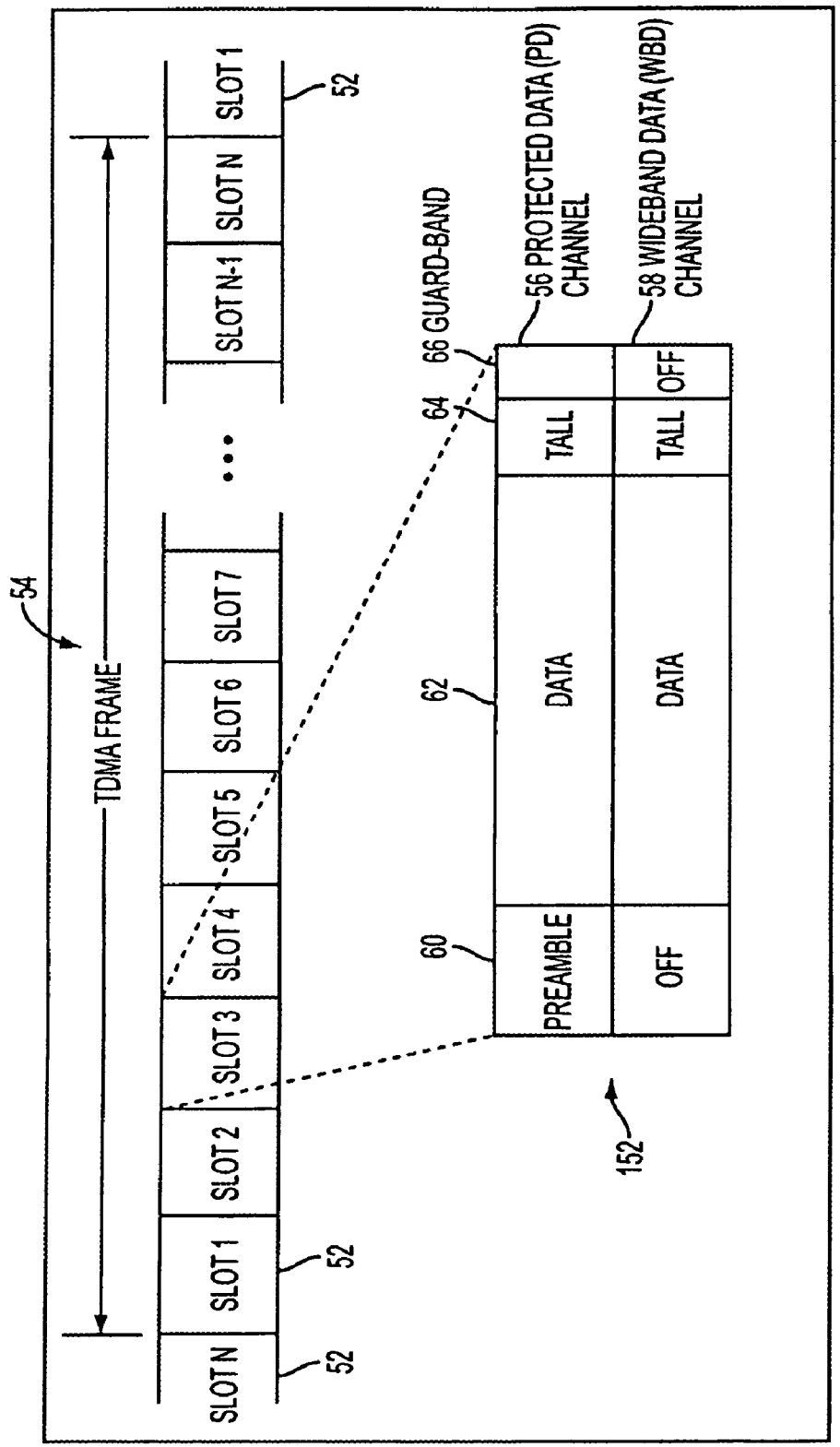
FIG. 2 is a block diagram of the slot definition for a communications link incorporating features of the present invention.

Referring to FIG. 2, a sequence of slots 52 of the link 50 are shown. As shown in FIG. 2, "N" number of identical slots 52, slot 1 to slot N, are grouped together to form a frame 54. The frame 54 is continually repeated to produce the link 50. For illustration purposes, the slot 152 designated as "slot 3" has been enlarged to reveal its internal structure. Unlike a traditional TDMA slot, in the present invention, an MPSK waveform is implemented. An MPSK slot generally comprises multiple, relatively independent channels, one of which is defined as a protected data (PD) channel 56. All other channels are assigned as wideband data (WBD) channels 58. The protected data channel 56 generally provides all link maintenance services issued by the remote node 30 and the necessary signal structure and timing used by the central node 20 to extract data from link 50. The wideband data channel 58 generally conveys user data from the remote node 30 to the control node 20.

Figure 3:
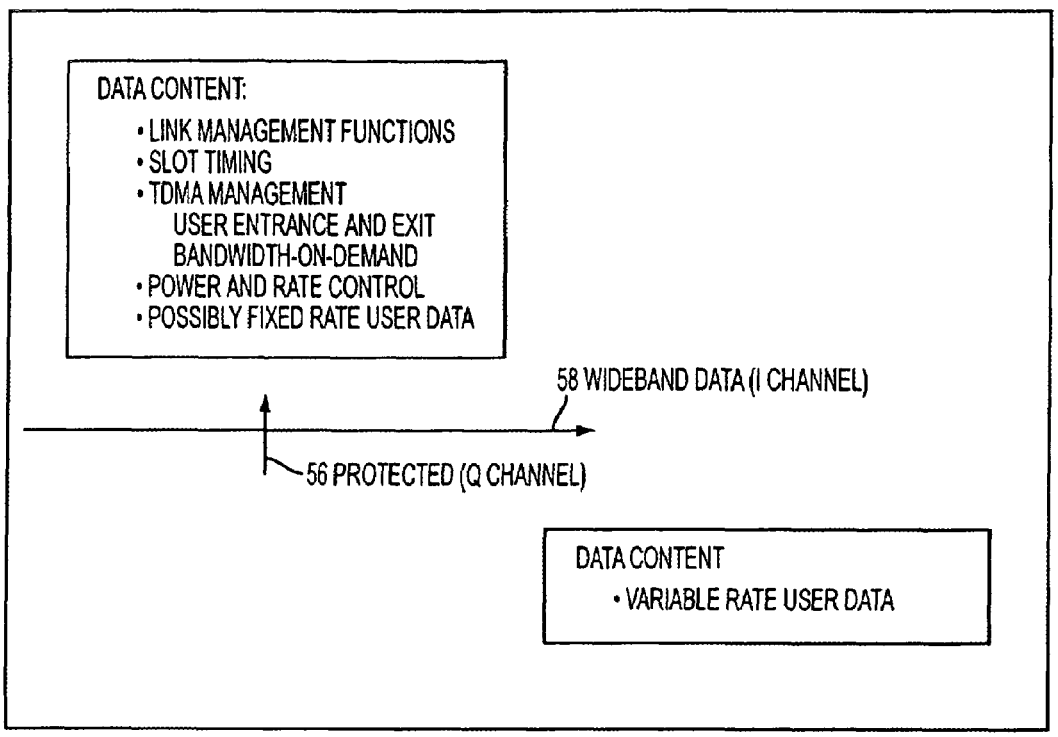
FIG. 3 is a graph illustrating a Bi-BPSK waveform for a system incorporating features of the present invention.

A transmission burst from a remote node 30 generally employs a Bi-Bi-phase shift keying (Bi-BPSK) waveform (one version of generalized MPSK) as described in U.S. Pat. No. 5,559,788, entitled "Multiple Channel Quadrature Communication System and Method", commonly assigned to the assignee of this application and which is incorporated herein by reference in its entirety. As shown in FIG. 3, a Bi-BPSK waveform generally comprises two orthogonal data channels, one designated as the protected data ("PD") channel 56 and the other as the wideband data ("WBD") channel 58. The wideband data channel 58 offers a higher data rate while the protected data channel 56 generally provides a much lower data rate at a significantly higher signal-to-noise ratio (SNR) As orthogonal channels, the protected data channel 56 and the wideband data channel 58 can be handled separately and independently in data content, data rate, data processing and spreading. Data rates of the two channels are relatively independent being constrained only by the need to be an integer multiple of a common chipping rate. In the case of a Bi-BPSK TDMA waveform, there is generally a single protected data channel 56 and a single orthogonal wideband data channel 58. The PD and WBD channels 56, 58 are spread using Direct Sequence/Spread Spectrum (DS/SS) modulation. The spreading codes used on the two data streams are orthogonal, but the chipping rate is the same for both and the two are synchronized. The PD and WBD channels 56, 58 are synchronously modulated in phase quadrature on a single carrier. The communications link 50 will work with a coherent or non-coherent carrier. This concept can also be extended to include frequency hopping.

Referring to FIG. 3, the Bi-BPSK waveform is generally a variation of a traditional quadrature phase shift key (QPSK) waveform in that the orthogonal I and Q channels are treated autonomously prior to modulation. As shown in FIG. 3, the relative size of the arrows represent the different protected data channel 56 and wideband data channel 58 rates that are possible. The higher signal-to-noise ratio of the protected data channel 56 can provide a robust and jam resistant link so that critical TDMA link management and maintenance information ($C^2I$ data) along with some critical, fix rate, user data can be successfully conveyed to the central node 20 with an extremely high degree of confidence. With the protected data channel 56 supplying the link maintenance functions, the wideband data channel 58 is dedicated to transferring user data. The quantity of user data being transmitted by a remote node 30 may differ from other remote nodes 30 and may locally vary with time. To accommodate this varied demand for capacity, the wideband data channel 58 is capable of providing bandwidth-on-demand (BOD) functionality. In addition, it is generally possible to adjust the number of slots 52 shown in FIG. 2 assigned to a remote node 30 by forming contiguous or non-contiguous slot assignments. Multiple slots 52 can be assigned to a remote node 30. For example, channel functions for the protected data channel 56 can include data content, link management functions, link timing, slot timing, TDMA management, user entrance and exit, bandwidth-on-demand, power and rate control and possible fixed rate user data. Channel functions of the data channel 58 can include data content and variable rate user data. This technique can be extended from the Bi-BPSK waveform to the general case of a MPSK waveform.

Referring to FIG. 2, the protected data 56 portion of the slot 52 structure generally includes four sections designated as the preamble 60, data 62, tail 64, and guard-band 66. During the preamble section 60, two events generally take place, namely, acquisition of the current TDMA slot 52 and initialization of the data processing hardware. For each slot 52, the hardware must be reinitialized to a known, base line state common to both the central node 20 and the remote node 30. Without this initialization, it is unlikely that the central node 20 can acquire the transmission burst and recover any data within a slot. The data section contains the information being sent by the remote terminal 30. The tail section 64 allows the hardware to complete the data processing of the last bits of information. The guard band 66 is adapted to provide a safety region between different slots 52 in order to remove any timing ambiguity between the central node 20 and the remote nodes 30 due to doppler, drift and other factors.

As shown in FIG. 2, the wideband data channel 58 is "off" throughout the preamble 60 and guard band 66 portions of the slot 52. These portions are not generally needed for time and recovery, but rather for hardware initialization. The data section 62 and the tail section 64 of the wideband data channel 58 is generally the same time duration as that for the protected data channel 56.

Generally, the slot structure shown in FIG. 2 has a 10% overhead, where the overhead is defined to be the total size occupied by the preamble 60, tail 64, and guard band section 66. In other words, for a given slot duration, 90% of the time is available for sending data.

The TDMA bandwidth-on-demand structure of the communications link 50 is generally adapted to be used in a network environment where information is sent in the data section 62 of the slot 52 using network packets. Generally, there is an integer number of network packets, also called cells, in each slot 52. The slot definition, size, structure, duration, does not need to be constant for an entire communication session. It is however, more difficult to manage variable slot sizes due to the level of coordination required between the central node 20 and the remote modes, 30. Generally, all of the remote nodes 30 acquire slot timing from the central node 20 and changes to that timing effects all members of the network 10. To avoid wasting communication bandwidth and link downtime, slot size changes can be synchronized across the entire communication network 10. Any remote node 30 in the network 10 can request a slot size change, however, only the central node 20 can initiate and orchestrate the change. In the preferred embodiment, the change is seamless.

The protected data channel 56 shown in FIGS. 2 and 3 is generally defined to be the low rate channel that offers a high signal-to-noise ratio and utmost in jam resistance. Via this channel 56, the remote node 30 can send the central node 20 information pertaining to TDMA link management and maintenance, and any critical, fixed rate, user data. In addition, the protected data channel 56 is adapted to provide the central node 20 with timing necessary to acquire and extract the transmission data for both the protected data 56 and wideband data channels. Because TDMA timing is extracted from the protected data channel 56, this channel generally avoids employing any signal processing techniques and data structures that would inhibit successful TDMA acquisition and data extraction.

Referring to FIG. 2, data is transmitted only during the data portion 62 of the slot 52. This gives a typical slot 52 an effective data rate capacity of 90% and an overhead capacity of 10%. In alternate embodiments, specific slot implementations can be different.

Generally, the protected data channel 56 operates at a fixed data rate. Environmental conditions however, may dictate that the normal data rate be adjusted to improve signal reception or to accommodate a critical user from a particular remote node 30 that requires a greater bandwidth. The central node 20, as part of normal TDMA operation, continually collects link quality metrics for the TDMA slot of each remote node. Base on these measurements, the central node 20 can request that a specific remote node 30, as well as possibly others, adjust its data rate for all future slot transmissions. The protected data channel 56 rate change occurs only at the beginning of a new slot frame. Generally, the protected data rate variability does not effect the slot duration. The protected data channel's slot data section 62 is generally structured to hold an integer number of packets (cells).

The wideband data channel 58 is generally the workhorse for conveying user data from the remote node 30 to the central node 20. The wideband data channel 58 generally comprises a variable rate channel that can be rate adjusted for each remote node 30 to accommodate the required data bandwidth. The wideband data channel 58 generally relies on the protected data channel 56 to supply the central node 20 with the necessary timing and link maintenance functions to successfully transfer and extract information and to support that TDMA slot 52. As a result, the wideband data channel 58 can readily support bandwidth-on-demand functionality with adjustments being made every slot time. Generally, the current slot 52 makes the necessary step-up adjustments for the next slot 52. The data section 62 for the wideband data channel 58 is generally structured to hold an integer number of packets (cells). To maximize data transfer and to minimize the required tail section 64, the wideband data channel 58 is generally adapted to use forward error correction (FEC) encoding, interleaving, and synchronization techniques. FEC coding and interleaving can improve link margin and data integrity for each wideband data channel 58. As independent channels, the FEC encoding and interleaving for the PD and WBD channels can be different. Selection of the encoding and interleaving algorithms should take into consideration the time constraints required to establish the link, to synchronize to the data, and to extract data all within the specified slot period.

As shown in FIG. 2, the data in the wideband data channel 58 is transmitted during the data portion 62 of the slot 52. This has a duration equal to that of the data section 62 of the protected data channel 56. Because the wideband data channel 58 can be configured to transfer data at a very high rate, the overhead penalty incurred by the preamble 60, tail 64 and guard band sections 66 is much less. Bandwidth efficiency of the wideband data channel 58 can be determined for each configuration.

Generally, prior to establishing the communication link 50 with a remote node 30, the central node 20 reverts to a default configuration for the network 10. The default configuration generally comprises all of the necessary parameters to place the communication network 10 into a known state, including for example, slot size, slot structure, broadcast waveform, TDMA waveform and TDMA BOD. In addition, the central node 20 can construct a remote node priority table from which link bandwidth, slot assignments, and BOD needs for example, can be arbitrated.

Following the initial definition of a slot 52, any node, including the central node 20, can request that the central node 20 redefine the slot definition including for example, slot structure, PD data rate, and slot duration, so long as its capability is active for the current communication link 50 definition. The new slot definition may be a previously stored configuration in the central node 20 that can be identified with an index or can be conveyed to the central node 20 over the communication link 50. The central node 20 determines if the change should be made. If yes, the central node 20 orchestrates the change. Otherwise, the requesting node is notified that the request is denied and given an appropriate reason code. Because of the difficulty in performing slot definition changes due to impact on system operations, this method of adjusting TDMA bandwidth is generally reserved for exceptional cases.

As shown in FIG. 2, a TDMA frame 54 generally comprises a number of identically structured slots 52 running from "slot 1" to "slot N". Almost all of the "N" slots are assigned by the central node 20 for TDMA transmission by remote nodes 30 in the communication network 10. However, a few slots can be generally reserved as "wild card" slots that are provided so that a new remote node 36 shown in FIG. 1 can request entry into the network 10.

The TDMA BOD structure of the communication link 50 does not generally dictate any particular methodology for assigning slots 52 to remote nodes 30. Initialization of the communication network 10 generally provides that the central node 20 be equipped with a default protocol or algorithm for establishing slot assignments early in the formation of the network for handling BOD requests. As the network matures, the central node 20 can assign slots 52 based on information provided to it by a network manager, which may be predetermined or loaded across the link 50. The network manager may be connected to either a central node 20 or a remote node 30 via a LAN 44 or 34, or it may be a function contained within the central node 20 or in a remote node 30. Network management responsibilities are delegated to a specific node or LAN user. The network manger generally oversees data rates, slot assignments, message routing, remote node entrance and exit, and other network parameters and operations. It is a feature of the present invention that the communication network 10 is a dynamic system with remote nodes 30 randomly entering and exiting the network 10. As a result, slot assignments are generally changed based on the number of remote nodes 30 present on the network 10 at any one time.

The timing for the communication network 10 generally originates at the central node 20. Different timing sources are possible for this central node timing and can include for example, such items as discrete digital synthesis (DDS), highly stable oscillators such as rubidium oscillators and global positioning systems (GPS). For example, when a remote node 30 enters the network 10, it generally slaves its timing to that of the central node 20 as derived from the broadcast link 40. In the case of GPS, all nodes can generally receive timing directly from a satellite and can be synchronized to the network 10 by the central node 20 via the broadcast link 40. Depending on the link timing scheme used by the network 10, remote nodes 30 entering the network 10 will generally require different amounts of time to be fully incorporated into the communication network 10.

The protected data channel 56 of a multiple phase shift key waveform allows the communication link 50 to be available over a greater range of environmental conditions. Although the wideband data channel 58 can experience outages, the protected data channel 56, with its high signal-to-noise ratio is generally designed to remain fully functional. Through the protected data channel 56, the communication link 50 is maintained and critical user data can be conveyed. Networks based on packet (cell) information work best in data links with bit error rates less than $1 \times 10^{-8}$. As error rates increase, link performance quickly deteriorates because of the need for constant retransmission of packets (cells).

The broadcast link 40 is generally a continuous transmission. The remote nodes 30 must generally acquire the broadcast link 40 prior to any TDMA transmission in order to ascertain slot timing, central node range, central node position, for example. Acquisition is generally made without a-priori knowledge of the broadcast link 40 over the central node 20. The central node 20 generally acquires and tracks TDMA transmissions within a single slot time. To ease the burden placed on the central node 20, each remote node 30 will generally make adjustments to its TDMA transmission.

The range between the central node 20 and each remote node 30 in the network 10 will generally vary. For TDMA transmissions, it is the responsibility of each remote node 30 to compensate for the slant range between themselves and the central node 20. Compensation adjusts remote node timing such that remote TDMA transmissions place the slot 52 at the specified slot time needed by the central node 20. In other words, each remote node 30 transmits its slot 52 so that it arrives at the central node 20 at the specified slot based on central node time.

Generally, there will be some error between the actual arrival time of the received slot and the expected arrival time of the slot. The central node 20 can measure this timing error and provide the remote node 30 with feedback so that future adjustments can be made and so that the timing error does not exceed the limits of the ability of the central node 20 to lock onto and extract data from the transmitted slot.

With respect to the central node 20, some remote nodes 30 will be getting closer while others will be moving away, a "doppler" effect. The remote nodes 30 are generally adapted to compensate for any doppler frequency variations so that the frequency received by the central node 20 is at a nominal value.

The communications link 50 is generally adapted to accommodate remote nodes 30 that asynchronously enter and exit the communication network 10. A remote terminal (node) 30 entering the network 10, such as for example, new remote node 36 in FIG. 1, will first successfully establish or acquire a broadcast link 40. Through the broadcast link 40, the new remote node 36 can determine the "wildcard" slot location, TDMA slot timing, and other relevant TDMA parameters. The new remote node 36, via the "wildcard" slot, can communicate with the central node 20 using a predefined entry protocol (application specific) to gain entrance into the communication network 10. Remote nodes 30 can be dynamically assigned to one or more slots 52 and even consecutive slots on a slot frame basis. The new remote node 36 can have a disadvantage in locking up because their timing has not been refined with respect to the central node 20. Once in the network 10, this timing ambiguity is quickly minimized. Remote nodes 36 entering the network 10 can also resolve higher level network protocols as required by a specific application.

The communication link 50 is generally designed to accommodate remote node exiting. This may occur due to conditions such as out of range conditions, signal blockage, jamming, mechanical failure, or the need to terminate transmission. If the remote node 30 knows this is going to occur, it can transmit a notification message to the central node 20. In the case when a remote node 30 fails to transmit, the central node 20 should not reassign the slot 52 until after a predetermined period of time.

It is a feature of the present invention to use the communication link 50 architecture to dynamically adapt the remote node 30 bandwidth requirements. Bandwidth adjustments are requested by a remote node 30 for implementation beginning with its next assigned slot. BOD capabilities pertain chiefly to the WBD channels 58 of the TDMA 50 and broadcast links 40 and can be handled on a slot by slot basis. For the most part, bandwidth issues pertain only to the WBD channel 58, however, in other cases the PD channel 56 bandwidth may also be altered. Changing PD channel bandwidth can impact link timing, management, and maintenance and the risk of momentarily losing the TDMA link 50.

Figure 4:
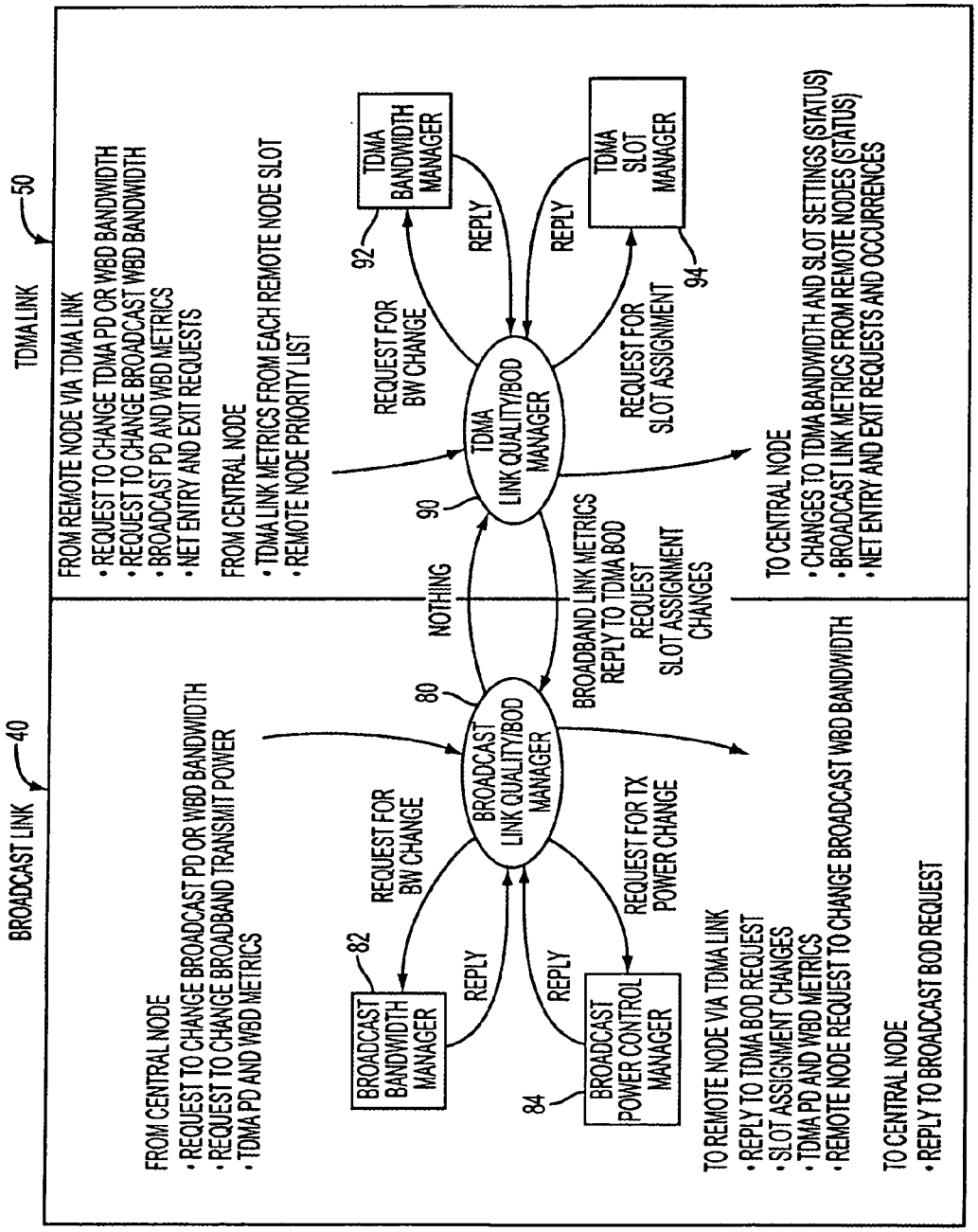
FIG. 4 is a block diagram of the link quality functionality for a communications link in a system incorporating features of the present invention.

FIG. 4 is an overview of the BOD/Link Quality control function performed by the central node 20. Since each link of the communication network 10 must service and respond to its own needs, conditions, and users, both links 40 and 50 have their own quality control function that operates relatively independent of the other. Link quality is handled by three management functions, Link Quality/BOD 80, 90, Bandwidth, 82, 92 Power Control 84, 94. The Link Quality/BOD manager 80, 90 serves as the master. Also shown in FIG. 4 is some of the data flow required to perform this quality control function. The data pertaining to this function is communicated between central node 20 and remote node 30 via the PD channel 58 of each link 40, 50.

Bandwidth allocated to a remote mode 30 on the TDMA link 50 can be adjusted by a combination of varying the number of time slots allocated to that node 30 and changing the data rate of the WBD 58 portion of the transmission. Wideband channel timing can be extracted because of the structural relationship between the wideband and high SNR channels and due to configuration setups being arranged previously over the link.

With the PD channels 56 providing the required functions to maintain the communication link 50 and a fixed slot size, the BOD can be provided to the remote nodes 30 in a few different ways. First, the bandwidth of the WBD channels 58 can be increased or decreased on a slot by slot basis as required by each active remote node 30. Second, contiguous slots can be temporarily preassigned to a remote node 30. Combining both methods offers the greatest range of bandwidth flexibility available to a remote terminal 30. In conjunction with the broadcast link, it may also be possible to provide BOD by adjusting slot sizes.

In order to implement BOD the remote node 30 must generally anticipate the need for changing the existing bandwidth allocation. In one embodiment, once a need has been determined, the remote node 30 requests a new bandwidth for WBD from central node 20. The central node 20 approves or denies the request based on a-priori information provided to the system. If approved, the central node 20 notifies the remote node that the rate change request has been approved and will take place on the next slot. This can be indicated by giving the slot number. If not approved, the central node 20 sends a request denied response to the remote node 30. If approved, the bandwidth for WBD changes at the specified slot in both the central node 20 and remote node 30 without loss of data. In one embodiment, the change is agreed upon one remote node slot time in advance of the change. In the slot time prior to the desired slot change, the remote node 30 must state what the new configuration desired is and request permission from the central node. The central node 20 immediately notifies the remote node 30 via the broadcast link 40 if the request is approved. If approved, the change takes place as directed. In one embodiment, a remote node 30 not requesting a change may receive direction from the central node 20 to make a change such as for example, being assigned new transmit slots.

Servicing multiple remote nodes 30 necessitates that the network architecture must assign priorities, which may or may not be fixed, to the different classes of users and message types. Based on these priorities, the central node 20 will know what BOD services are available to each remote node 30 and how best to allocate link bandwidth among the remote nodes 30.

Data rates of the WBD channel 58 and PD channel 56 can be set independently. Adjusting the TDMA WBD rate can occur on every slot boundary and will not cause any loss of data. Adjusting the TDMA PD rate will also not result in the loss of data since it is changed only at the slot frame boundary. Broadcast data rates for the WBD 58 and PD channels 56 can also be set independently. However, changing either rate may temporarily cause loss of data.

Generally, maximum link data rates are limited to what can be supported by the Gain/Temperature (G/T) or Effective Isotropic Radiated Power (EIRP) of the node.

The transmit power can be adjusted to either improve link margin and hence the received bit error rate, or to lower the probability of detection. The receiving node will estimate the received $E_b N_o$ of each received transmitted signal and periodically provide feedback to each transmitting node.

The communications link 50 demonstrates jam resistant properties due to the use of spread spectrum, interleaving and FEC encoding techniques that are being applied to the TDMA waveform. The actual degree of jam resistance depends on the ratio of the spreading rate to the channel data rate. The greater the ratio, the more jam resistance and the less outages.

Low Probability of Detection (LPD) properties are also features of the communications link 50 due to the use of spread spectrum, interleaving, FEC encoding, and transmit power control techniques that are being applied to the TDMA waveform. The actual degree of jam resistance can depend on the ratio of the spreading rate to the channel data rate and the effectiveness of the transmit power algorithm. The greater the ratio, the greater the low probability of detection (LPD).

Referring to FIG. 5, an embodiment of an exemplary system incorporating features of the present invention is shown. In FIG. 5, the central node comprises an airborne communications platform 120, such as an aircraft, while the remote nodes comprise platforms 130, such as ground vehicles, spread out over a wide terrain. The remote nodes 130 could also be airborne. There is no scale associated with FIG. 5, and the distances and spacing between the central node 120 and remote nodes 130, and between remote nodes 130, can be any suitable distance. The airborne platform 120 can continuously transmit the broadcast link 140 to the ground unit 130. Each ground unit can communicate with the airborne unit 120 via the communications link 150. Remote node 32 represents a new node trying to establish a link with the central node 120.

By combining Time Division Multiple Access (TDMA) networked microwave communication protocol, with Direct Sequence/Spread Spectrum (DS/SS) bandwidth-on-demand (BOD) orthogonal Bi-BPSK modulation, it is possible to provide a high quality of network service in a dynamic operating environment. This configuration utilizes both transmit power control and dynamic bandwidth adaptation to provide each user in the network with a high quality of service based on real time link quality indicators, bandwidth demand, and jammer threat (both hostile and friendly). The performance of Code timing, Slot timing, and Carrier tracking loops can be significantly increased by using one of the orthogonal Bi-BPSK channels as a high Signal-to-Noise Ratio (SNR) tracking channel. This channel would also contain critical link command and control and mission critical data, and ensures the link can be maintained, even under the most adverse conditions. By slaving the TDMA sequencing to the Pseudo-Noise (PN) code sequence, the reliability of network timing is increased because the high SNR tracking channel significantly reduces the occurrence of link dropout. The other orthogonal Bi-BPSK channel would provide additional bandwidth-on-demand for each user until a predetermined link quality threshold is reached, at which point the bandwidth allocation algorithm would limit user bandwidth. This combination provides a high quality, networked communication link that can dynamically adapt to a broad range of opening environments while satisfying diversified user communication needs.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A communications system comprising:
  a central node;
  at least one remote node receiving information transmitted from the central node over a broadcast link; and
  a communications link comprising a time division multiple access link using a multi-phase shift key waveform, with a first channel operating at a lower data rate to achieve a high signal-to-noise ratio, and a second channel providing bandwidth-on-demand for transferring only user data, the second channel operating at a higher data rate and lower signal-to-noise ratio than the first channel, the communications link conveying information from the remote node to the central node, the remote node providing slot timing and link synchronization via said first channel, and the central node dynamically tailoring a remote node transmit power control and a bandwidth as requested by the remote node for conveying information over the communications link.

2. The system of claim 1 wherein the broadcast link transfers link maintenance information from the central node to each of the remote nodes.

3. The system of claim 2 wherein the link maintenance information is data used to maintain and manage the broadcast link and the communications link.

4. The system of claim 1 wherein the communications link comprises a time division multiple access link using bi-BPSK modulation.

5. The system of claim 1 wherein the first channel further provides slot management functions, the slot management functions being independent of the second channel.

6. The system of claim 1 wherein the first channel provides all management functions for the communications link and the second channel meets remote node bandwidth needs on demand.

7. The system of claim 1 wherein the second channel adjusts wideband channel performance for transfer of a user data on a slot by slot basis.

8. The system of claim 1, wherein the first channel further comprises slot management, wherein the slot management is independent of the second channel, where the second channel is a separate user channel used as a dedicated conduit for transport of user data that is dynamically adjusted to provide different power and rate control at each slot to provide optimal performance based on user needs and a link environment.

9. A communications system comprising:
  a central node that transmits information over a broadcast link to at least one remote node, the broadcast link providing link maintenance and management functions; and
  a time division multiple access link using bi-BPSK modulation to convey information from the remote node to the central node, the multiple access link including a first channel operating at a lower data rate to achieve a high signal-to-noise ratio to provide slot timing and link synchronization, and a second channel that operates at high data rates and lower signal-to-noise ratio than the first channel to transfer only user data and to meet bandwidth needs on demand of individual remote nodes.

10. The system of claim 9 wherein the first channel is an embedded high signal-to-noise ratio tracking channel.

11. The system of claim 9 wherein the second channel provides a dedicated conduit for transmitting user data from the remote node to the central node.

12. The system of claim 9 wherein the second channel is a wideband channel that is rate adjusted for an individual remote node to accommodate a required data bandwidth for the remote node.

13. The system of claim 12 wherein the time division multiple access link adjusts a performance of the wideband channel on a slot by slot basis.

14. A method of dynamically altering transmit power control and bandwidth transmission requirements of a remote node in a communications network including a plurality of remote nodes, the method comprising the steps of:

acquiring link management information transmitted from a central node to the remote node over a broadcast link;

requesting a new remote node transmit power control and a new transmit data bandwidth from the central node by sending a request from the remote node to the central node over a time division multiple access communications link using a multi-phase shift key waveform, wherein a high signal-to-noise ratio channel in the link is used to provide the remote node transmit power control with slot timing and link synchronization, and a wideband channel operative at a lower signal-to-noise ratio in each slot of the link is rate adjusted to meet the transmit data bandwidth needs of the remote node on demand; and implementing the change in a remote node slot time subsequent to the request.

15. The method of claim 14 wherein the step of implementing the change further comprises the step of dynamically configuring the wideband channel to accommodate the new transmit data bandwidth on a slot by slot basis.

16. The method of claim 14 further comprising the step of dynamically assigning one or more slots to a new remote node entering the network.

17. The method of claim 14 further comprising only two separate channels in each slot, one channel being the high signal to noise ratio channel and the other being the wideband channel.

18. The method of claim 17 further comprising maintaining TDMA slot timing, link synchronization and slot management on the high signal-to-noise ratio channel and transporting data only on the wideband channel.

* * * * *